March 2, 1971     MASAYA YANAGITA ET AL     3,566,581
GAS CHROMATOGRAPHY METHOD
Filed June 2, 1969     4 Sheets-Sheet 1

INVENTORS
MASAYA YANAGITA,
KAORU TSUBOYAMA,
SEI TSUBOYAMA,
NOBUO IKEKAWA

BY
*Stevens, Davis, Miller & Mosher*
ATTORNEYS

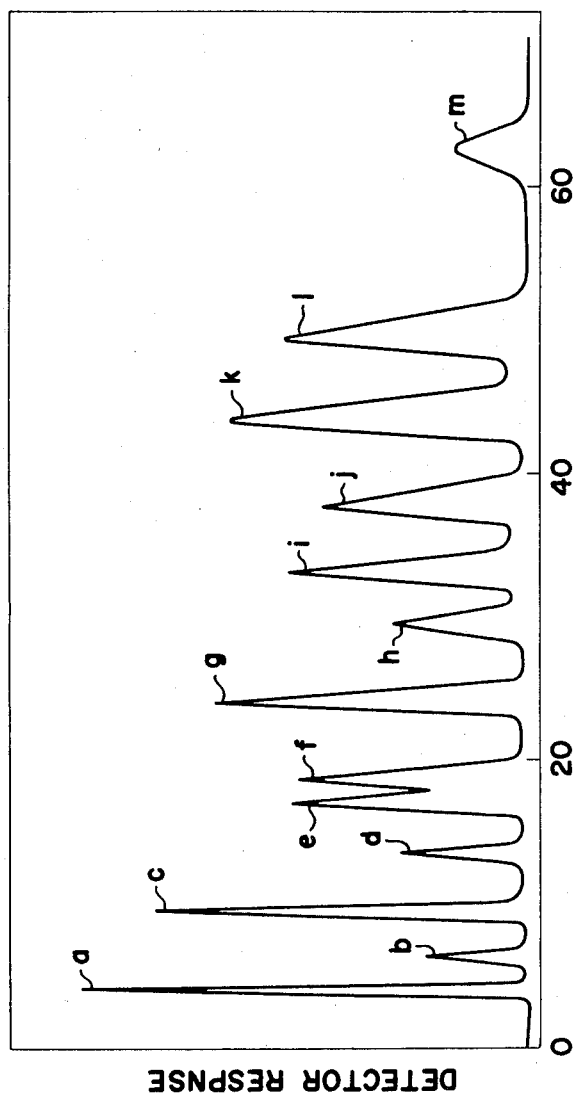

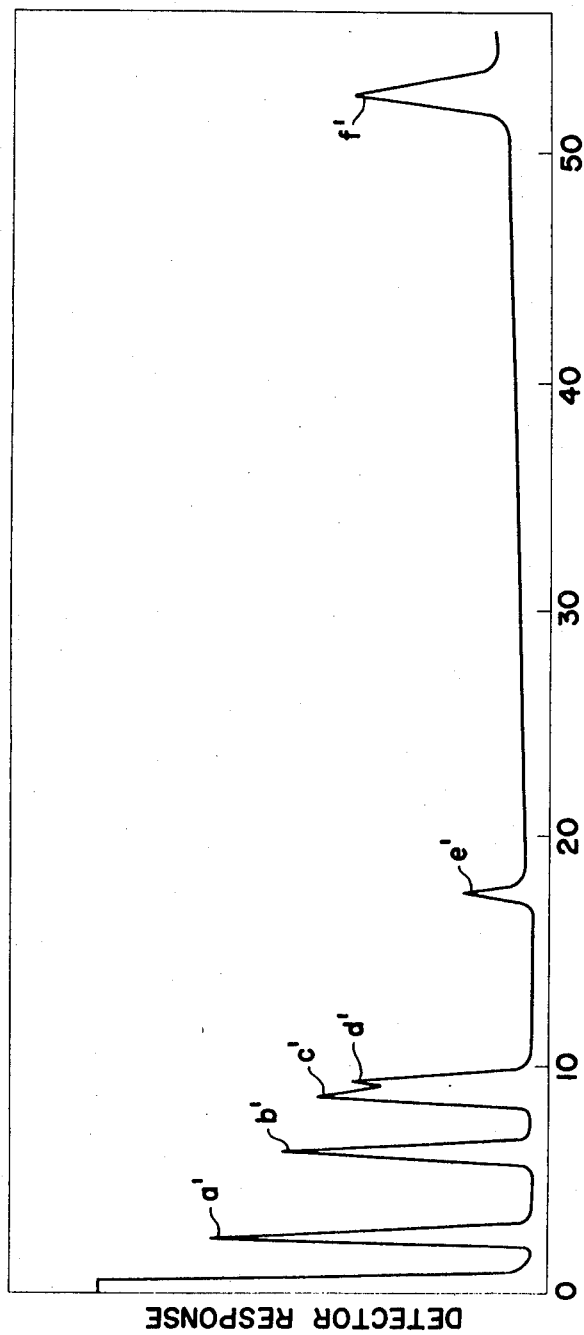

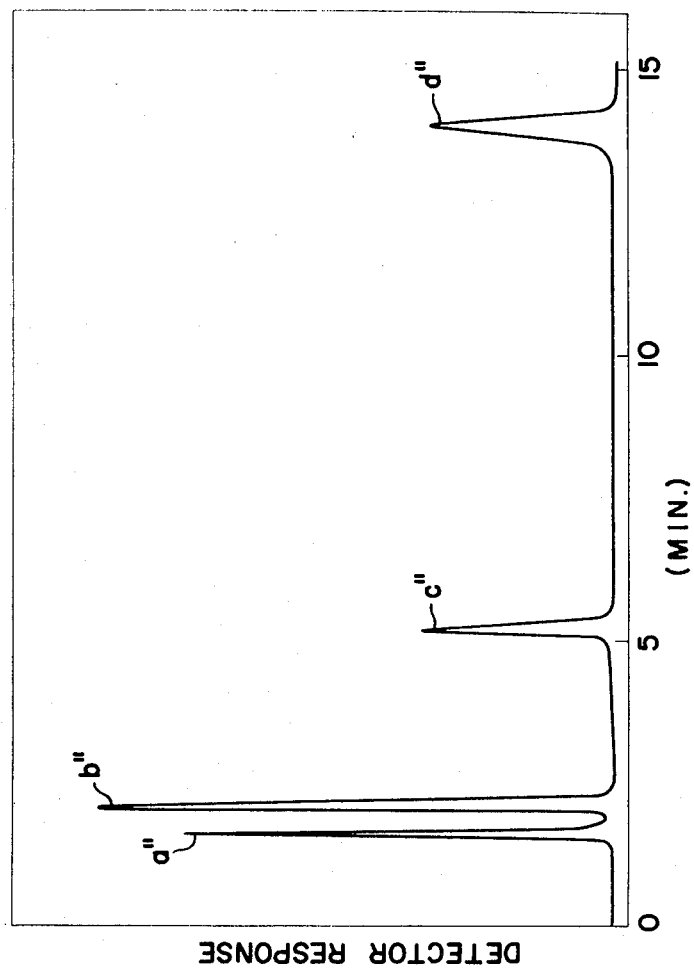

3,566,581
GAS CHROMATOGRAPHY METHOD
Masaya Yanagita, Kaoru Tsuboyama, Sei Tsuboyama, and Nobuo Ikekawa, Tokyo, Japan, assignors to Kaken Kagaku Kabushiki Kaisha, Tokyo, and Rikagaku Kenkyusho, Yamato-machi, Japan
Filed June 2, 1969, Ser. No. 829,336
Claims priority, application Japan, June 4, 1968, 43/38,221
Int. Cl. B01d 15/08
U.S. Cl. 55—67                 5 Claims

ABSTRACT OF THE DISCLOSURE

Gas chromatography using a polymer having the following general formula:

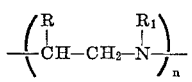

wherein R represents alkyl or aryl group and $R_1$ represents a member selected from hydrogen, alkyl and aryl groups, as liquid phase of the column. According to the present invention any mixture of amines and other organic compounds can be more easily isolated and the thermal stability of the column can be excellently improved.

---

This invention relates to a novel gas chromatography which can analyze various organic compounds, especially various amines, with good separation.

Various kinds of column and combination of liquid phase and support have heretofore been used for gas chromatography and they have been able to attain the objective to a certain extent. Although it has been found that a certain improvement can be obtained by selecting a suitable liquid phase, it has been desired that development of a column having good capacity of separation for various kinds of substances and better thermal stability. It should be especially noted that there is not yet found and suitable column for separation of various amines, and development of column packings with sufficient ability to separate various amines contained in biological materials is very much behind. In the analysis of amines, in general, sensitivity of detector and tailing of peak are the greatest obstacle, in addition to the problems of high volatility of low-boiling amines and lowering of separating capacity of the column by absorption of carbon dioxide and water from air. In order to avoid these defects, it has been proposed to convert the amines to the corresponding stable derivatives but such a conversion is complicated and does not proceed quantitatively. Attempts have also been made to use various amines in liquid phase but this method cannot be used for high-boiling compounds.

Furthermore to prevent the tailing, supports have been pretreated with alkali and then coated with liquid phase. However such the finished packing could not appear sufficient results.

The present invention relates to a novel column, particularly a liquid phase for gas chromatography. The liquid phase according to the present invention comprises poly(2-substituted aziridine) or its N-substituted polymer. In the separation and purification of various organic compounds, this invention provides a universally useful column which possesses excellent separatory ability, with correction of the above defects.

According to the present invention, the polymer(s) to be used in the column are poly(2-substituted aziridine) and its N-substituted polymers having the following general formula and obtained by polymerization of the corresponding aziridines in the presence of an acid catalyst.

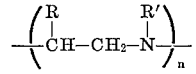

wherein R is an alkyl, aryl group such as methyl, ethyl, propyl, isopropyl, isobutyl, phenyl, or benzyl group, and R' is hydrogen, alkyl or aryl group such as methyl, ethyl, butyl, benzyl, or phenyl group.

The representative compounds of poly(2-substituted aziridines) are poly(2-ethylaziridine),

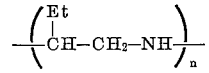

and poly(2-isobutyl-aziridine),

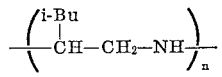

and the representatives of their N-substituted polymers are poly(N-benzyl-2-ethylaziridine),

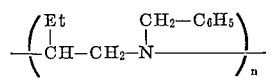

and poly(N-methyl-2-isobutylaziridine),

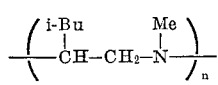

The polymers mentioned above can be impregnated in amount of approximately 1–30% by weight into a suitable support, such as diatomaceous earth, fluorine resin, fire brick, glass, or quartz, to obtain the desired column packing.

In addition the polymers mentioned above can be used as the liquid phase in an empty capillary column.

According to the present invention, the specific polymer as described above is used as a liquid phase, then the column has an excellent heat resistance, does not volatile even at ca. 250° C., and can be used over a long period of time. It can be used for gas-chromatography of various organic compounds, especially for amines, irrespective of aliphatic or aromatic ones, and shows an excellent separatory ability.

The column of the present invention can overcome any defects of conventional columns sufficiently, and rapid and reproducible analysis can be carried out easily with good precision.

The present invention will be more fully understood according to the following explanation in view of the attached drawing.

FIGS. 2, 3 and 4 are the gas chromatograms with the column packing for gas chromatography of the present invention, FIG. 2 being that of a mixture of 13 kinds of methylpyridines, FIG. 3 that of a mixture of six kinds of amino acid methyl esters, and FIG. 4 that of four kinds of alcohols.

Figure 1:
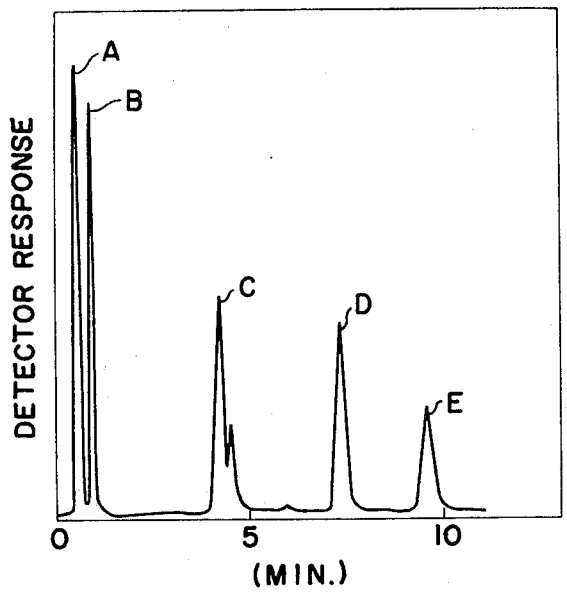
FIG. 1 is the gas chromatogram of a mixture of five kinds of amines using the column packing of the present invention.

We have carried out gas-chromatographic test by using the column packing according to the present invention, such as the column packing coated with poly(2-ethylaziridine) and its derivatives on various amines (pyridine, 2,4,6-collidine, dimethylaniline, aniline, benzylamine, o-phenylenediamine, amylamine, triethylamine, monoethanolamine), esters (methyl, ethyl, and propyl acetates), alcohols (methanol, ethanol, n-propanol, isopropanol, n-butanol), and aromatic hydrocarbons (benzene, toluene, xylene) and it was found that these column packings have an excellent separatory character showing good patterns in chromatograms.

A satisfactory result was also obtained in a similar separation using a column of a support coated with poly(N-benzyl - 2-ethylaziridine) or poly(N-methyl - 2-isobutylaziridine).

Some examples of this invention are given below. It is to be understood that this invention is not limited by these examples.

PREPARATION OF LIQUID PHASE (1) To 7 g. of 2-ethylaziridine chilled to $-70°$ C., 5 mol percent of boron trifluoride-etherate ($BF_3 \cdot Et_2O$) was added under nitrogen atmosphere, the mixture was sealed in a tube, and allowed to stand over night. The temperature was then gradually raised up to 100° C. and kept at the same temperature for 48 hours. After completion of the reaction, the polymer formed was dissolved in benzene, the catalyst was decomposed with alkali, and the benzene solution was washed with water until the washings became neutral. Benzene was evaporated under a reduced pressure, leaving poly(2-ethylaziridine) as a pale yellow liquid, with a molecular weight of ca. 3,000–5,000. Yield, 6.5 g.

(2) To 2 g. of 2-isobutylaziridine chilled to $-70°$ C., 5 mol percent of boron trifluoride-etherate ($BF_3 \cdot Et_2O$) was added under nitrogen atmosphere, the mixture was sealed in a tube, and allowed to stand over night. The temperature was then raised gradually up to 100° C. and kept at the same temperature for 48 hours. After completion of the reaction, the polymer formed was dissolved in benzene, the catalyst was decomposed by alkali, and the solution was washed with water until the washings became neutral. Freeze-drying of the washed benzene solution afforded poly(2-isobutylaziridine) as a white powder, with a molecular weight of ca. 5,000. Yield, 1.7 g.

(3) To 2 g. of N-benzyl-2-ethylaziridine chilled to $-70°$ C., 5 mol percent of boron trifluoride-etherate ($BF_3 \cdot Et_2O$) was added under nitrogen atmosphere, the mixture was sealed in a tube, and allowed to stand overnight. The temperature was then gradually raised to 100° C. and kept at the same temperature for 48 hours. After completion of the reaction, the polymer formed was dissolved in benzene, the catalyst was decomposed by alkali, and the solution was filtered. Freeze drying of the filtrate afforded poly(N-benzyl-2-ethylaziridine) as a pale yellow light powder of M.P. 60–72° C., with a molecular weight of ca. 2,000. Yield, 1.0 g.

(4) To 2 g. of N-methyl-2-isobutylaziridine chilled to $-70°$ C., 5 mol percent of boron trifluoride-etherate ($BF_3 \cdot Et_2O$) was added under nitrogen atmosphere, the mixture was sealed in a tube, and allowed to stand over night. The temperature was then raised gradually up to 100° C. and kept at the same temperature for 48 hours. After completion of the reaction, the polymer formed was dissolved in benzene, the catalyst was decomposed by alkali, and the solution was washed with water until the washings became neutral. Benzene was evaporated under a reduced pressure and the residue was repeatedly reprecipitated in cold acetone, thereby leaving poly(N-methyl-2-isobutylaziridine) with a molecular weight of ca. 1,500 as a pale yellow tacky solid. Yield, 1.0 g.

PREPARATION OF COLUMN PACKING (1) Celite 545 (registered trademark: a product of Johns Manville) (60–80 mesh) was used as a support and a column packing containing 5% of poly(2-ethylaziridine) described above as the liquid phase (1) was prepared by the filtration method. This was filled in a glass column (4 mm. x 150 cm.). The column was conditioned by passing the mobil phase ($N_2$ or He) at 200° C. for 48 hours.

(2) Shimalite-W (registered trademark: a product of Shimadzu Seisakusho) (80–100 mesh) was used as a support and a column packing containing 10% of poly(2-ethylaziridine) described above as the liquid phase (1) was prepared by the filtration method. This was filled in a glass column (4 mm. x 300 cm.). The column was conditioned by passing the mobil phase ($N_2$ or He) at 200° C. for 48 hours.

(3) Shimalite-C (registered trademark: a product of Shimadzu Seisakusho) (60–80 mesh) was used as a support and a column packing containing 25% of poly(2-ethylaziridine) described above as the liquid phase (1) was prepared by the filtration method. This was filled in a glass column (4 mm. x 200 cm.). The column was conditioned by passing mobil phase ($N_2$ or He) at 200° C. for 48 hours.

(4) Shimalite-WAW (registered trademark: a product of Shimadzu Seisakusho) (80–100 mesh) was used as a support and a column packing containing 5% of poly(2-isobutylaziridine) described above as the liquid phase (2) was prepared by the filtration method. This was filled in a glass column (4 mm. x 200 cm.). The column was conditioned by passing mobil phase ($N_2$ or He) at 200° C. for 48 hours.

(5) Shimalite-W (registered trademark: a product of Shimadzu Seisakusho) (80–100 mesh) was used as a support and a column packing containing 5% of poly(N-benzyl-2-ethyl-aziridine) was prepared by the filtration method. This was filled in a glass column (4 mm. x 200 cm.). The column was conditioned by passing mobil phase ($N_2$ or He) at 200° C. for 48 hours.

Example 1

Analysis was carried out on a mixture of five kinds of amines (triethylamine, amylamine, collidine, benzylamine, and aniline) using the column packing (1) described above, with Shimadzu Model GC–2C gas chromatograph equipped with a thermal conductivity detector, under the condition of column temperature of 100° C. and carrier gas (helium) flow rate of 20 ml./min. Result thereby obtained is shown in FIG. 1, in which A indicates triethylamine, B is amylamine, C is collidine, D is benzylamine, and E is aniline.

Example 2

Analysis was carried out on a mixture of pyridine and 12 kinds of methylpyridine ($\alpha$-picoline, 2,4-lutidine, 2,6-lutidine, 3,4-lutidine, 2,3,4-collidine, 2,3,5-collidine, 2,3,6-collidine, 2,4,5-collidine, 2,4,6-collidine, 3,4,5-collidine, 2,3,4,5-tetramethylpyridine, and 2,3,5,6-tetramethylpyridine) using the column packing (2) described above, with Shimadzu Model GC–4AP gas chromatograph equipped with hydrogen flame detector, under the conditions of column temperature of 105° C. and carrier gas (nitrogen) flow rate of 28 ml./min. The result thereby obtained is indicated in FIG. 2, in which $a$ indicates pyridine, $b$ is $\alpha$-picoline, $c$ is 2,6-lutidine, $d$ is 2,4-lutidine, $e$ is 2,4,6-collidine, $f$ is 2,3,6-collidine, $g$ is 3,4-lutidine, $h$ is 2,3,5-collidine, $i$ is 2,4,5-collidine, $j$ is 2,3,4-collidine, $k$ is 2,3,5,6-tetramethylpyridine, $l$ is 2,3,4,5-tetramethylpyridine, and $m$ is 3,4,5-collidine.

Example 3

Analysis was carried out on a mixture of six kinds of amino acid methyl esters, i.e., the methyl esters of alanine, valine, leucine, isoleucine, aspartic acid, and phenylalanine, using the column packing (2) described above, with Shimadzu Model GC–4AP gas chromatograph equipped with hydrogen flame detector, under the condition of column temperature of 110 to 160° C. (temperature—programed at 1° C./min.) and carrier gas (nitrogen) flow rate of 25 ml./min. Result thereby obtained is shown in FIG. 3, in which $a'$ indicates alanine, $b'$ is valine, $c'$ is leucine, $d'$ is isoleucine, $e'$ is aspartic acid and $f'$ is phenylalanine.

Example 4

Analysis was carried out on a mixture of methanol, ethanol, n-propanol, and n-butanol, using a column packing (3) described above, with Shimadzu Model GC-4AP gas chromatograph equipped with hydrogen flame detector, under the condition of column temperature of 60° C. and carrier gas (nitrogen) flow rate of 20 ml./min. Result thereby obtained is indicated in FIG. 4, in which $a''$ indicates methanol, $b''$ is ethanol, $c''$ is n-propanol, and $d''$ is n-butanol.

Example 5

Figure 5:
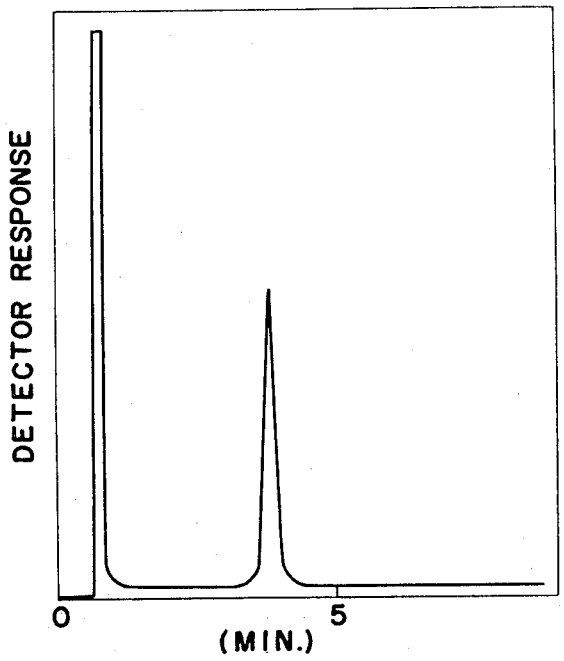
FIG. 5 is the gas chromatogram of phenyl 11-iodo-10-undecynoate using the column packing of this invention.

Analysis was carried out on phenyl 11-iodo-10-undecynoate, using the column packing (5) described above, with Hitachi-Perkin-Elmer Model F6-D gas chromatograph, equipped with a hydrogen flame detector, under the condition of column temperature of 200° C. and carrier gas (nitrogen) flow rate of 30 ml./min., and the result thereby obtained is shown in FIG. 5.

Analyses were also carried out on amines, alcohols, and esters, using the column packings (4) and (5) described above, under the same conditions as given in Example 1, except for using Hitachi-Perkin Elmer Model F6-D gas chromatograph equipped with a hydrogen flame detector, and results thereby obtained were approximately the same as those from Examples 1, 3 and 4.

What we claim is:

1. A gas-chromatographic method, characterized by using a polymer as a liquid phase, selected from the group consisting of poly(2-substituted aziridines) and their N-substituted polymers, said polymers of the following general formula:

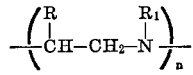

wherein R represents alkyl having from 2 to 4 carbon atoms or aryl group and $R_1$ represents hydrogen, alkyl or aryl group.

2. A process according to claim 1, wherein the poly (2-substituted aziridine) contains a polymer selected from the group consisting of poly(2-ethylaziridine) and poly (2-isobutylaziridine).

3. A process according to claim 1, wherein the poly (2-substituted aziridine) contains a polymer selected from the group consisting of poly(N-benzyl-2-ethylaziridine) and poly(N-methyl-2-isobutylaziridine).

4. A process according to claim 1, wherein the polymer is supported on a solid.

5. A process according to claim 1, wherein the polymer is used in an empty capillary column.

References Cited

UNITED STATES PATENTS

| | | | |
|---|---|---|---|
| 3,277,128 | 10/1966 | Voort | 260—2X |
| 3,354,103 | 11/1967 | White | 260—2X |

OTHER REFERENCES

Grob, K., "New Liquid Phases for the Gas Chromatographic Separation of Strong Bases on Capillary Columns," Gas Chromatography Abstracts 1965, page 119.

J. L. DECESARE, Primary Examiner

U.S. Cl. X.R.

260—2